United States Patent Office 3,531,547
Patented Sept. 29, 1970

3,531,547
COMPOSITION, METHOD AND ARTICLE
Stanley M. Hazen, Cheswick, and William J. Heilman, Allison Park, Pa., assignors to Gulf Research & Development Company, Pittsburgh, Pa., a corporation of Delaware
No Drawing. Filed Dec. 27, 1967, Ser. No. 693,756
Int. Cl. C08f 15/00, 37/00
U.S. Cl. 260—78.5         13 Claims

ABSTRACT OF THE DISCLOSURE

Liquid compositions, curable to infusible resins and articles containing the same, comprising an unsaturated monoepoxy compound, curable by a free radical mechanism, such as glycidyl methacrylate, and a monohydride of a carboxylic acid, such as maleic anhydride or phthalic anhydride, are provided. A third vinyl monomer, curable by a free radical mechanism, such as styrene, is optional, as is a monooxirane compound having as its only functional group a single oxirane oxygen atom, such as epichlorohydrin. In the case of an unsaturated monoanhydride, any vinyl comonomer, whether normally curable by a free radical mechanism or not, such as hexene-1, is useful. In another embodiment, any monoepoxide is used in combination with a maleic anhydride, and a vinyl monomer capable of free radical polymerization. Curing is effected by establishing free radicals, as by heat or by the use of peroxy compounds, for example. The articles include castings and for certain of the resins, coatings are provided.

This invention relates to new liquid compositions capable of being cured to solid infusible resins at room temperature, or at elevated temperatures.

Of the many types of resinous compositions in the art, the epoxy resins, obtained by cross-linking agents, have received a substantial amount of attention from those working in the art, as have resins prepared from reactants including dianhydrides and monoepoxy compounds. In many ultimate applications of resins, such as in coating, casting, potting, laminating, adhering objects together, encapsulating, and filament winding, it is important that the materials have good curing properties and the final products must have the desired physical and chemical characteristics. Important characteristics are flexural strength and toughness such as impact resistance, or hardness and rigidity where these are required, heat distortion temperature, rapid curing, smoothness and clarity of film, dimensional uniformity of the end cured product, and good adhesion, and many of these properties are often required. The reaction of a solution of a liquid monooxirane compound with a solid polyanhydride (where the anhydride groups are not directly attached to and form part of an aromatic ring) such as a polyanhydride prepared by the copolymerization of an α-olefin and maleic anhydride, gives resins which have many of the foregoing properties.

Such a procedure requiring a plurality of reactions, has obvious disadvantages.

Surprisingly, it has now been found that similar resins may be prepared in a single polymerization step by forming a solution, curable to a solid resin, comprising monomers consisting essentially of (A) At least one epoxy monomer selected from
  (1) An olefinically unsaturated monoepoxide polymerizable by free radicals; and
  (2) A monoepoxide having as its only functional group a single oxirane oxygen atom;

(B) A monoanhydride selected from
  (1) Maleic anhydride or a derivative thereof having radicals other than hydrogen on one or both of the α-carbon atoms, with the proviso that this monomer be present when said solution is free of said olefinically unsaturated monoepoxide; and
  (2) A monoanhydride having 4 to 5 carbon atoms in the anhydride ring, said anhydride ring being free of olefinic unsaturation; and (C) Optionally, a vinyl monomer, with the proviso that it be polymerizable by a free radical mechanism when the anhydride ring of the selected anhydride is saturated, each of said monomers being free of —COOH groups, the anhydride group to epoxy group ratio on an equivalency basis being from about 0.2:1 to 2:1, and causing polymerization to take place.

It will thus be seen that various embodiments of the invention are presented. For example, the monomers may comprise (I)

(A) An olefinically unsaturated monoepoxide polymerizable by free radicals; and
(B) Maleic anhydride or a derivative thereof having radicals other than hydrogen on one or both of the α-carbon atoms, or (II)

(A) An olefinically unsaturated monoepoxide polymerizable by free radicals;
(B) Maleic anhydride or a derivative thereof having radicals other than hydrogen on one or both of the α-carbon atoms; and
(C) A vinyl monomer, or (III)

(A) An olefinically unsaturated monoepoxide polymerizable by free radicals;
(B) Maleic anhydride or a derivative thereof having radicals other than hydrogen on one or both of the α-carbon atoms; and
(C) A vinyl monomer polymerizable by a free radical mechanism, or (IV)

(A) An olefinically unsaturated monoepoxide polymerizable by free radicals; and
(B) A monoanhydride having 4 to 5 carbon atoms in the anhydride ring, said anhydride ring being free of olefinic unsaturation; or (V)

(A) An olefinically unsaturated monoepoxide polymerizable by free radicals;
(B) A monoanhydride having 4 to 5 carbon atoms in the anhydride ring, said anhydride ring being free of olefinic unsaturation; and
(C) A vinyl monomer polymerizable by a free radical mechanism, or (VI)

(A) An olefinically unsaturated monoepoxide polymerizable by free radicals;
(B) A monoepoxide having as its only functional group a single oxirane oxygen atom; and
(C) Maleic anhydride or a derivative thereof having radicals other than hydrogen on one or both of the α-carbon atoms, or (VII)

(A) A monoepoxide having as its only functional group a single oxirane oxygen atom;
(B) Maleic anhydride or a derivative thereof having radicals other than hydrogen on one or both of the α-carbon atoms; and (C) A vinyl monomer polymerizable by a free radical mechanism, or (VIII)

(A) An olefinically unsaturated monoepoxide polymerizable by free radicals;
(B) A monepoxide having at its only functional group a single oxirane oxygen atom;
(C) Maleic anhydride or a derivative thereof having radicals other than hydrogen on one or both of the α-carbon atoms; and
(D) A vinyl monomer polymerizable by a free radical mechanism.

Maleic anhydride or a substituted maleic anhydride is the selected anhydride for thin coatings, and for such coatings the liquid solution is as follows:

(A) Maleic anhydride or a substituted maleic anhydride;
(B) At least one vinyl hydrocarbon monomer which is capable of copolymerizing with maleic anhydride or a substituted maleic anhydride by free radical means to produce a copolymer having a dilute solution viscosity of at least 0.5; and
(C) At least one liquid monomer containing a single epoxide group.

A single monomer can satisfy both B and C inmmediately above. Thus, glycidyl acrylate is a monomer capable of copolymerization by free radical means with maleic anhydride to give a copolymer having the required dilute solution viscosity, and glycidyl acrylate also contains a single epoxide group.

For castings it is possible to inhibit or prevent volatilization of monomers, and difficulty soluble monoanhydrides such as phthalic anhydride are useful, because the temperature during dissolution and of curing may be sufficiently high (e.g., up to 150° C. or higher) so that a solution is obtained. In the case of thin coatings of a few mils in thickness, however, low temperatures must be utilized to prevent volatilization of some of the monomers, and certain materials, such as phthalic anhydride, precipitate during curing and are thus not useful for coatings. Herein the terms "monooxirane compound," "monoepoxide," and "monoepoxy compound" are used interchangeably.

The novel curable compositions, i.e., solutions, are useful to prepare certain novel cured resins, including those prepared from materials including anhydrides having a saturated anhydride ring, i.e., those having a succinic anhydride or glutaric anhydride nucleus. The actual structure of the polymer molecule prepared from reactants consisting essentially of the unsaturated monoepoxide and maleic anhydride or a substituted maleic anhydride is novel. Further, where the reactants comprise maleic anhydride or a substituted maleic anhydride, the unsaturated monoepoxy compound and a vinyl monomer, the polymer is believed to differ in structure from that obtained by reacting an unsaturated monoepoxy compound and a polyanhydride (in the form of a copolymer of a vinyl monomer and maleic anhydride or a substituted maleic anhydride). In this latter case, the primary reactions of the epoxy compound involve reactions of the epoxy and anhydride groups, and self-polymerization of the olefinic bonds of the epoxy compounds. In the former case, the olefinic groups of each of the epoxy compound, the maleic anhydride compound and the vinyl compound have the opportunity to react.

The ratio of the selected monoanhydride to the monoepoxy compound or compounds (referred to elsewhere herein as the A/E ratio) is expressed on an equivalency basis. The A/E ratio is suitably between about 0.2 equivalent and 2.0 equivalents of anhydride groups per equivalent of epoxy groups. Preferably the A/E ratio is between about 0.4 and 1.5:1, and still more preferably between about 0.4 and 0.75.

The amount of the vinyl monomer is between 0% and 60% by weight of the final solution, with preferred amounts being between 5% and 30% of the weight of the final curable solution. The quantity of monoepoxy compound having as its only functional group a single oxirane oxygen atom which is optionally present when an unsaturated monoepoxide is employed, is between 0% and a mole ratio of 10:1 and more preferably a mole ratio between about 0.5:1 and 2:1 of the monoepoxy compound having as its only functional group a single oxirane oxygen atom to the unsaturated monoepoxide.

The saturated and unsaturated monooxirane compounds are preferably liquids, the monoanhydride is either liquid or solid, the vinyl monomer is preferably a liquid, and they must be mutually soluble.

The monoanhydride compound useful in preparing the compositions of the invention may be represented by the general Formulas I through VII below, Formulas I and II being inclusive of maleic anhydride and substituted maleic anhydrides, while Formulas III through VII represent the substituted or unsubstituted succinic anhydrides and glutaric anhydrides.

FORMULA I

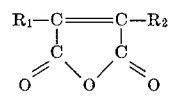

wherein $R_1$ is a member selected from the group consisting of hydrogen, halogen, a hydrocarbon radical and a substituted hydrocarbon radical; and $R_2$ is selected from the group consisting of hydrogen and halogen atoms. Examples of suitable monoanhydrides having the above formula are as follows:

maleic anhydride;
chloromaleic anhydride;
methylmaleic anhydride;
hexylmaleic anhydride;
phenylmaleic anhydride;
diphenylmaleic anhydride;
naphthylmaleic anhydride;
dibromomaleic anhydride;
1-chloro-2-methylmaleic anhydride;
1-bromo-2-heptylmaleic anhydride;
1-chloro-2-heptadecylmaleic anhydride;
1-chloro-2-heptacosylmaleic anhydride;
1-chloro-2-cyclohexylmaleic anhydride;
1-bromo-2-phenylmaleic anhydride;
1-chloro-2-p-decylphenylmaleic anhydride;
1-chloro-2-heptylmaleic anhydride;
chloromethylmaleic anhydride;
3-bromooctylmaleic anhydride;
phenoxymethylmaleic anhydride;
phenoxydocosylmaleic anhydride;
6-pentanoxyoctylmaleic anhydride;
1-chloro-2(2-phenoxyethyl)maleic anhydride;
cyanoethylmaleic anhydride;
4-cyanononylmaleic anhydride; and
1-bromo-2(3-cyanohexyl)maleic anhydride.

FORMULA II

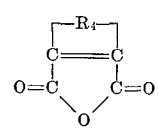

where $R_4$ is selected from the group consisting of a divalent hydrocarbon radical having between 2 and 5 cyclic carbon atoms and a substituted divalent hydrocarbon radical having between 2 and 5 cyclic carbon atoms. The total number of carbon atoms in $R_4$ can be between 3 and 36 and is preferably between 4 and 16. Examples of suitable monoanhydrides having the above Formula II are as follows:

1,2-dicarboxyliccyclobutene anhydride;
1,2-dicarboxyliccyclopentene anhydride;
1,2-dicarboxyliccyclohexene anhydride;
1,2-dicarboxyliccycloheptene anhydride;
1,2-dicarboxylic-4-chlorocyclopentene anhydride;
1,2-dicarboxylic-4-methylpentene anhydride;
1,2-dicarboxylic-5-octacosylcycloheptene anhydride;
1,2-dicarboxylic-5-cyanocyclohexene anhydride;
1,2 - dicarboxylic - 4 - pentyl - 5 - octylcyclohexene anhydride; and
1,2 - dicarboxylic - 4(2 - chloropentyl) - cyclohexene anhydride.

FORMULA III

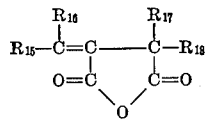

where $R_{15}$, $R_{16}$, $R_{17}$ and $R_{18}$ can be the same or different and are selected from the group consisting of hydrogen, halogen, a hydrocarbon radical and a substituted hydrocarbon radical. Examples of suitable monoanhydrides having the above Formula III are as follows:

itaconic anhydride;
1,2-dicarboxylic-pentene-2 anhydride;
1,2-dicarboxylic-octene-2 anhydride;
1,2-dicarboxylic-tetradecene-2 anhydride;
1,2-dicarboxylic-eicosene-2 anhydride;
1,2-dicarboxylic-4-methyloctene-2 anhydride;
1,2-dicarboxylic-octadecene-2 anhydride;
2,4-dimethyl-3,4-dicarboxylic-pentene-2 anhydride;
1,1-dimethyl-1,2-dicarboxylic-octene-2 anhydride;
1,2-dicarboxylic-3-cyanohexene-2 anhydride; and
1,2-dicarboxylic-4-bromoeicosene-2 anhydride.

FORMULA IV

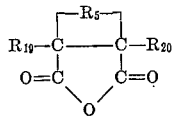

where $R_{19}$ and $R_{20}$ can be the same or different and are selected from the group consisting of hydrogen, halogen, a hydrocarbon radical, and a substituted hydrocarbon radical; and $R_5$ is a member selected from the group consisting of an unsaturated divalent hydrocarbon radical having between 3 and 5 carbon atoms wherein the unsaturation occurs between any two adjacent cyclic carbon atoms. The total number of carbon atoms in $R_5$ can be between 3 and 36 and is preferably between 4 and 10. Compounds having the structure according to Formula IV above can be prepared by the Diels-Alder reaction between a conjugated diene and maleic anhydride. For example, cyclopentadiene and maleic anhydride react to form Nadic anhydride. Castor oil also reacts with maleic anhydride to form adducts corresponding to Formula IV. Examples of other suitable compounds having the above Formula IV include:

bicyclo(2.2.1)5-heptene-2,3-dicarboxylic anhydride;
cis-4-cyclohexene-1,2-dicarboxylic anhydride;
7-oxabicyclo(2.2.1)5-heptene-2,3-dicarboxylic anhydride;
4-methyl-4-cyclohexene-1,2-dicarboxylic anhydride;
bicyclo(2.2.2)1-octene-4,5dicarboxylic anhydride; and
2-styryl-5-phenyl-1-cyclohexene-3,4-dicarboxylic anhydride.

FORMULA V

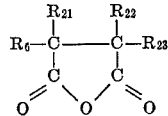

where $R_{21}$, $R_{22}$, and $R_{23}$ can be the same or different and are selected from the group consisting of hydrogen, halogen, a hydrocarbon radical, and a substituted hydrocarbon radical; and $R_6$ is a member selected from the group consisting of an unsaturated hydrocarbon radical and an unsaturated substituted hydrocarbon radical. Examples of suitable compounds having the above formula are as follows:

propenylsuccinic anhydride;
butenylsuccinic anhydride;
hexenylsuccinic anhydride;
dodecenylsuccinic anhydride;
octadecenylsuccinic anhydride;
octenylsuccinic anhydride;
isopropenylsuccinic anhydride;
eicosenylsuccinic anhydride;
1-dodecenyl-2-chlorosuccinic anhydride;
1,2-dichlorododecenylsuccinic anhydride;
1,1-dipropyl-2-methyl-2-propenylsuccinic anhydride; and
1-octyl-1-bromo-2-butyl-2-dodecenylsuccinic anhydride.

FORMULA VI

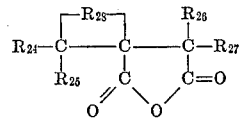

where $R_{24}$, $R_{25}$, $R_{26}$ and $R_{27}$ can be the same or different and are selected from the group consisting of hydrogen, halogen, a hydrocarbon radical and a substituted hydrocarbon radical; and $R_{28}$ is an unsaturated divalent hydrocarbon radical having four cyclic carbon atoms. The total number of carbon atoms in compounds having the Formula VI above can be between 9 and 40 and is preferably between 9 and 16. These compounds can suitably be prepared by the Diels-Alder reaction between a conjugated diene and itaconic anhydrides.

In the compounds represented by Formulas I, III, IV, V, and VI above, where the selected radicals $R_1$, $R_2$, $R_6$, and $R_{15}$ through $R_{27}$ are from the group consisting of hydrocarbon and substituted hydrocarbon radicals, they can have between 1 and 30 and preferably between 1 and 15 carbon atoms. The total number of carbon atoms per molecule for any particular compound represented by Formulas I through VI can be between 4 and 40 and preferably between 4 and 20.

The composition of this invention in one embodiment thereof, also comprises a cyclic monoanhydride having at least five carbon atoms and having from 4 to 5 carbon atoms in the anhydride ring. The preferred monoanhydride compounds may be represented by the formula

FORMULA VII

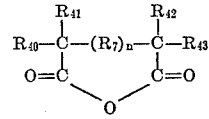

wherein the radicals $R_{40}$, $R_{41}$, $R_{42}$, and $R_{43}$ are, independently, hydrogen, halogen, hydrocarbon, or substituted hydrocarbon radicals, the radical $R_7$ is —$CH_2$— and $n$ is zero or 1, with the proviso that at least one of said radicals comprises one or more carbon atoms. One embodiment is that in which the radicals comprise one having a carbocyclic nucleus. Thus, the radicals $R_{41}$ and $R_{42'}$ together with the carbon atoms of the succinc anhydride nucleus to which they are attached, may form a carbocyclic nucleus, such as one comprising six carbon atoms. The basic criterion for selecting the monoanhydride is that it be soluble in the resin-forming solution. Further, it should not react with other materials in the solution prior to the polymerization reaction in such a way as to effect decomposition of any ingredient, and it should be relatively nonvolatile. Apart from these criteria, practically any cyclic monoanhydride of a dicarboxylic acid having 5 or more carbon atoms and having from 4 to 5 carbon atoms in the anhydride ring is useful according to the invention.

By the term "hydrocarbon radical" as used here is meant any group of atoms consisting of carbon and hydrogen, such as alkyl, preferably saturated, having from 1 to about 20 or more carbon atoms, cycloalkyl, preferably saturated, having from 4 to about 20 or more carbon atoms, and aryl, alkaryl, and aralyl having from 6 to about 30 or more carbon atoms. By the term "substituted hydrocarbon radical" is meant hydrocarbon radicals as defined above, but where one or more atoms therein have been exchanged for a halogen; —C≡N; —OR group where R is any hydrocarbon radical as defined above; or

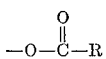

where R is any hydrocarbon radical as defined above. Examples of such radicals, in connection with named compounds, are given throughout the specification. Examples of suitable monoanhydrides having Formula VII are as follows:

methylsuccinic anhydride;
phenylsuccinic anhydride;
glutaric anhydride;
propylsuccinic anhydride;
butylsuccinic anhydride;
hexylsuccinic anhydride;
eicosanylsuccinic anhydride;
phthalic anhydride;
pentadecylsuccinic anhydride;
cyclohexylsuccinic anhydride;
orthotolylsuccinic anhydride;
diphenylsuccinic anhydride;
naphthylsuccinic anhydride;
cyanoethylsuccinic anhydride;
dioctylsuccinic anhydride;
1,8-naphthalic anhydride;
α,α-dimethylbenzylsuccinic anhydride (cumylsuccinic anhydride);
4-endomethylenetetrahydrophthalic anhydride;
methylbicyclo(2.2.1)heptene-2,3-dicarboxylic anhydride (Nadic methyl anhydride);
octadecylsuccinic acid anhydride;
dodecylsuccinic acid anhydride;
3-methoxy-1,2,3,6-tetrahydrophthalic acid anhydride;
4-propyl-8-methyl-eicosylsuccinic anhydride;
1-bromo-2-heptylsuccinic anhydride;
1-bromo-2-phenylsuccinic anhydride;
1,2-dicarboxyliccyclopentane anhydride;
1,2-dicarboxyliccycloheptane anhydride;
chloromethylsuccinic anhydride;
1,2-dicarboxylic-4-chlorocyclopentane anhydride;
1,2-dicarboxylic-4-octylcyclohexane anhydride;
1,2-dicarboxylic-5-cyanocyclohexane anhydride;
1,2-dicarboxylic-4(2-chloropentyl-cyclohexane) anhydride;
bicyclo(2.2.1.)-heptane-2,3-dicarboxylic anhydride;
7-oxabicyclo(2.2.1)heptane-2,3-dicarboxylic anhydride;
cyclohexane-1,2-dicarboxylic anhydride; and
bicyclo(2.2.2)-octane-4,5-dicarboxylic anhydride.

The composition of this invention also preferably comprises an olefinically unsaturated monooxirane compound containing as its only functional groups a single oxirane oxygen atom and at least one olefinic double bond capable of being polymerized by free radical means. By a functional group is meant a group such as an oxirane oxygen atom which would participate in the anhydride-monoepoxide reaction, i.e., combine chemically with the anhydride, such as for example —OH, —SH, and —NH groups. By an oxirane oxygen atom is meant an oxygen atom directly connected to two carbon atoms which carbon atoms are connected to each other, i.e.,

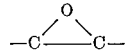

The monooxirane also contains at least one, and preferably only one, olefinic double bond capable of being polymerized by free radical means. By free radical means in this application is meant thermal means, i.e., heat; ultra-violet light; radiation and well known free radical chemical initiators, such as organic peroxides, azo compounds, etc., as mentioned below. Suitable ethylenically unsaturated monooxirane compounds are those which contain at least one terminal CH$_2$=C< grouping.

The alpha-olefinically unsaturated monooxirane compound contain substituents directly connected to the beta-carbon atom of the alpha olefin, which substituents result in a net electron withdrawal from the alpha olefin double bond. In other words, the alpha olefin double bond is activated for polymerization by substituents or groups which effect an electron withdrawal from the olefinic double bond. Electron withdrawing groups are well known in the art and include, for example, halogen;

where R' is any organic radical; —C≡N; an aromatic organic radical;

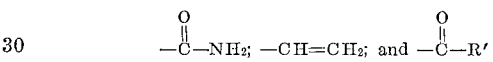

where R' is any organic radical. Substituents or groups which donate electrons are undesirable, but can be used if the net effect of the two substituents on the beta-carbon atom of the alpha olefin is to effect an electron withdrawal and result in a monomer which is capable of polymerization by free radical means. Substituents which donate electrons are also well known in the art and include, for example, —OR', where R' is any organic radical; —CR$_{30}$R$_{31}$R$_{32}$, where R$_{30}$, R$_{31}$, and R$_{32}$ are selected from the group consisting of hydrogen and any organic radical. For example,

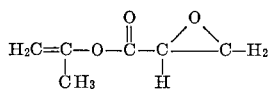

contains an electron donating group (—CH$_3$) and an electron withdrawing group

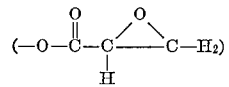

of about equal power on the beta-carbon atom. This compound is therefore unsuitable because the net effect is that there is no electron withdrawal from the double bond. In a similar manner, allyl glycidyl ether, i.e.,

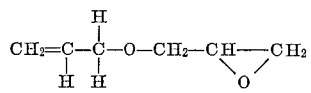

is not a suitable monooxirane compound for the compositions of this invention since the

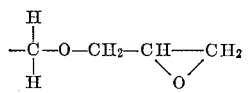

group donates electrons to the double bond. On the other hand, compounds having the general formula

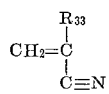

where R$_{33}$ is an alkyl group containing a single oxirane oxygen atom, readily polymerize even though R$_{33}$ is an electron donating group because —C≡N is such a strong electron withdrawal group that the net effect, i.e., the summation of the electron donating power of the R₃₃ group and the electron withdrawal power of the —C≡N group is that electrons tend to be withdrawn from the olefinic double bond, thus activating it for polymerization. As a further example, a compound such as

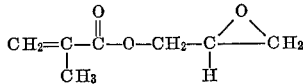

will readily polymerize even though the beta-carbon atom contains the electron donating methyl group, since again the electron withdrawal power of the

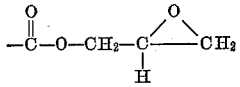

group is greater than the electron donating power of the CH₃ group.

The preferred monooxirane compounds are the alpha-olefinically unsaturated terminal monoepoxides represented by the general formula:

FORMULA VIII

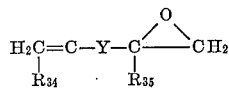

where R₃₅ is selected from the group consisting of hydrogen and a saturated hydrocarbon radical having between 1 and 10 carbon atoms;
where R₃₄ is selected from the group consisting of hydrogen; halogen; —C≡N; —C—NH₂; —COOR″, where R″ is any saturated hydrocarbon radical having between 1 and 10 carbon atoms; and

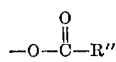

where R″ is as defined when Y is selected from the group consisting of

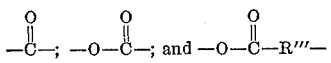

where R‴ is any divalent hydrocarbon radical having between 1 and 20 carbon atoms; and
where R₃₄ is selected from the group consisting of a saturated hydrocarbon radical having between 1 and 10 carbon atoms; hydrogen; halogen; —C≡N; —C—NH₂; —CORR″ where R″ is as defined; and

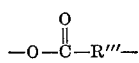

where R‴ is as defined when Y is

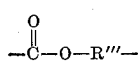

where R‴ is any divalent hydrocarbon radical having between 1 and 20 carbon atoms.

In general, the total number of carbon atoms in the monooxirane compound is suitably between 4 and 30, and preferably between 4 and 10 carbon atoms per molecule. The total number of carbon atoms in the preferred monooxirane compound should be such that the compound is liquid at about room temperature. Examples of suitable compounds include, but are not limited to, glycidyl methacrylate;
glycidyl acrylate;
glycidyl propacrylate;
3,4-epoxy butene-1;
3,4-epoxy-3-chloro butene-1;
3,keto-4,5-epoxy pentene-1;
2-decyl-2,3-epoxy propyl acrylate;
2-methyl-3-keto-4,5-epoxy pentene-1;
3-keto-4-methyl-4,5-epoxy pentene-1;

2-cyano-3-keto-4,5-epoxy pentene-1;
epoxy ethyl propenoate

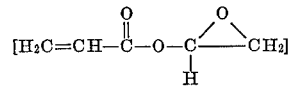

2-methyl-2,3-epoxy propyl acrylate;

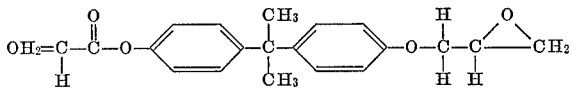

4-methyl-4,5-epoxy pentyl acrylate;
4-methyl-4,5-epoxy pentyl methyl acrylate;
2-methyl-2,3-epoxy propyl methyl acrylate;
vinyl 3-methyl-3,4-epoxy butanoate;
vinyl 3,4-epoxy butanoate

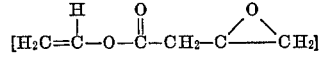

and
vinyl 7,8-epoxy octanoate.

In one embodiment of the invention, the vinyl compounds optionally incorporated in the curable solution are olefinic compounds ordinarily not curable by a free radical mechanism as represented by the general formula

FORMULA IX

where R₃ is selected from the group consisting of hydrogen, halogen, a hydrocarbon radical and a substituted hydrocarbon radical, and x₁ and x₂ are selected from the group consisting of hydrogen, halogen, a hydrocarbon radical, a substituted hydrocarbon radical and —OR where R is any hydrocarbon radical as defined above. The olefinic compound suitably has between 2 and 40 carbon atoms per molecule, preferably between 2 and 30, and more preferably between 6 and 20 carbon atoms per molecule.

It is preferred that R₃ in the above general formula be hydrogen and the sum of the carbon atoms in x₁ and x₂ is less than 28. The preferred olefinic compounds for this embodiment of the invention are the aliphatic alpha monoolefins having between 2 and 30 carbon atoms per molecule.

It is understood that the term "olefin" is meant to include mixtures of monoolefins having between 2 and 40 carbon atoms per molecule, such as those obtained by the thermal or catalytic cracking of petroleum stocks. It is desirable that only one olefinic bond per molecule be present in the anhydride or the olefin since more than one double bond per molecule promotes gel formation and internal cross-linking. Minor amounts of di-olefins, on the order of two percent or less, can however, be tolerated in the anhydride and olefin.

Examples of olefin compounds or mixtures of olefins suitable to form the compositions of this invention include: ethylene; propylene; 1-butene; 2-butene; 1-pentene; 2-pentene; 1-hexene; 3-hexene; 1-heptene; 1-octene; 1 - nonene; 4 - nonene; 1-decene; 2-decene; 1-undecene; 1-dodecene; 1-tridecene; 1-tetradecene; 1-octadecene;1-eicosene; 1-docosene; 1-heptacosene; 1-hentriacontene; 2 - methyl - 1 -butene; 4 - methyl - 1 - pentene; 3 - ethyl - 2 - pentene; 3,3 - dimethyl-1-pentene; 2-methyl-1-heptene; 3,3 - dimethyl - 1 - hexene; 4,4-dimethyl - 1-heptene; 2 - methyl - 1 - nonadecene; 3 - heptadecyl-2-eicosene; and 2-methyl-4-propyl-3-heptene.

In another embodiment, the compositions of this invention may comprise an olefinically unsaturated monomeric compound free of oxirane oxygen atoms polymerizable by a free radical mechanism, and containing as its only functional groups at least one olefinic double bond capable of said polymerization by free radical means. This olefinically unsaturated compound must be free of oxirane oxygen atoms and other functional groups which would participate in the anhydride-monoepoxide reaction, i.e., combine chemically with the anhydride or epoxide groups, such as for example, —OM, —SH, and —NH groups. The preferred olefinically unsaturated compounds are those containing between 2 and 20 carbon atoms and between 1 and 2 olefinic double bonds capable of polymerization by free radical means. More preferably, the olefinically unsaturated compounds are those that have between 2 and 10 carbon atoms which are liquid at or about room temperature. It is only essential that these olefinically unsaturated monomeric compounds form a liquid solution with the selected solid polyanhydride and the selected olefinically unsaturated monooxirane compound at a temperature less than the cure temperature of the three component mixture.

Olefinically unsaturated monomeric compounds which polymerize by a free radical mechanism are well known in the art and are generally alpha-olefinically unsaturated compounds which contain substituents directly connected to the beta-carbon atom of the alpha-olefin, which substituents, in a manner similar to the discussion with respect to the unsaturated monooxirane compound above, result in a net electron withdrawal from the alpha olefin double bond. In other words, the alpha olefin double bond is activated for polymerization by substituents or groups which effect an electron withdrawal from the olefinic double bond. Electron withdrawing groups are well known in the art and include, for example, halogen:

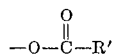

where R' is any organic radical;

where R' is any organic radical;

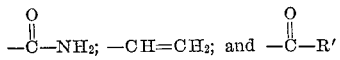

where R' is any organic radical. Substituents or groups which donate electrons are undesirable, but can be used if the net effect of the two substituents on the beta-carbon atom of the alpha olefin is to effect an electron withdrawal and result in a monomer which is capable of polymerization by free radical means. Substituents which donate electrons are also well known in the art and include, for example, —OR', where R' is any organic radical;

—$CR_{30}R_{31}R_{31}$, where $R_{30}$, $R_{31}$ and $R_{32}$ are selected from the group consisting of hydrogen and any organic radical.

The olefinically unsaturated compounds defined in the preceding two paragraphs are capable of polymerization by free radical means to produce a homopolymer. In addition, the olefinically unsaturated monoxirane compounds defined above are capable of polymerization by free radical means to produce a homopolymer. When two olefinically unsaturated compounds both of which are capable of homopolymerization by free radical means are admixed and subjected to a free radical polymerization, a mixture of homopolymers, a copolymer, or a mixture of both can be obtained depending on the concentration of the components in the mixture and their reactivity ratios. Fred W. Billmeyer, Jr., in his textbook of Polymer Science, published by Interscience in 1962, defines the monomer reactivity ratios $r_1$ and $r_2$ as the ratios of the rate constants for a given radical adding its own monomer to its adding to the other monomer. In other words, a reactivity ratio for a given monomer can be defined as the ratio of the reaction rate constant to the formation of polymer of a given monomer with itself, divided by the reaction rate constant to the formation of copolymer of the given monomer with a second added monomer. If $r_1$ is greater than one, this means that monomer one prefers to add to itself, while if $r_1$ is less than one, this means that a given monomer prefers to add to the second added monomer. In the compositions of the subject case, the situation is further complicated by the fact that, while the olefinically unsaturated monomeric compound free of oxirane oxygen atom is capable of homopolymerization or copolymerization with the olefinically unsaturated monoxirane compound, the olefinically unsaturated monooxirane compound is additionally capable of reacting and does react with the monoanhydride. It has been found quite unexpectedly that instead of the olefinically unsaturated compound homopolymerizing or forming a separate copolymer solid with the olefinically unsaturated monooxirane compound, a single homogeneous solid resin is formed on curing. By a homogeneous resin is meant a resin where the components are combined chemically with each other and which has a uniform structure throughout, that is, a homogeneous resin is one which is soluble to less than ten weight percent of the added olefinically unsaturated oxirane free monomer in a solvent, such as acetone, for the homopolymer of said monomer over a period of twenty four hours. The preferred olefinically unsaturated compounds curable by free radical means for use in the compositions of this invention are those having a reactivity ratio or less than three at 60° C. and more preferably, should have a reactivity ratio of less than one.

The preferred olefinically unsaturated monomeric compounds polymerizable by a free radical mechanism are those selected from the class consisting of:

(1) Vinyl monomers having the general formula

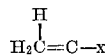

where x can be any aryl group having between 1 and 3 rings; halogen;

—C≡N; —$OR_{36}$, where $R_{36}$ is any hydrocarbon radical having between 1 and 20 carbon atoms which can be substituted by halogen and —C≡N groups;

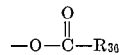

where $R_{36}$ is as defined; and

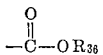

where $R_{36}$ is as defined;

(2) Beta substituted propylenes having the general formula:

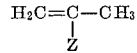

where Z is selected from the class consisting of

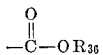

where $R_{36}$ is as defined; —C≡N; phenyl; and

and (3) Vinylidene compounds having the general formula

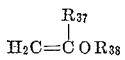

where $R_{37}$ and $R_{38}$ can be the same or different and are selected from the class consisting of —C≡N and halogen.

The styrene-type compounds, such as styrene, alpha-methyl styrene and p-chlorostyrene, and the lower alkyl acrylates and methacrylates, such as methyl and butyl acrylate and methacrylate, are particularly preferred.

Examples of suitable olefinically unsaturated monomeric compounds include:

acrylamide;
acrylonitrile;
methacrylamide;
methacrylonitrile;
vinylidene cyanide;
allyl methacrylate;
m- and p-bromostyrene;
butadiene;
2-chloro-1,3-butadiene;
di-n-butyl itaconate;
2,3-dichloro-1,3-butadiene;
2,5-dichlorostyrene;
dimethyl itaconate;
N,N-divinylaniline;
divinyl sulfide;
divinyl tartrate;
N-ethyl methacrylamide;
5-ethyl-2-vinylpyridine;
ethyl vinyl sulfide;
fumaronitrile;
vinyl dodecyl ether;
vinyl butyl ether;
methyl methacrylate;
vinylidene chloride;
p-acetyl aminostyrene;
n-(p-anisyl)methacrylamide;
m- and p-chlorostyrene;
N-butyl maleimide;
p-cyanostyrene;
di(betachloroethyl) itaconate;
p-dimethylaminostyrene;
4-chloro-1-vinylnaphthalene;
6-chloro-2-vinylnaphthalene;
divinyl ether;
divinyl sulfone;
ethyl 1-acetoxy acrylate;
ethyl vinyl oxalate;
N-ethyl-N'-vinylurea;
2-fluorobutadiene;
p-iodostyrene;
isopropenyl isocyanate;
methyl acrylate;
N-methyl methacrylamide;
p- and m-methyl styrene;
m-nitrostyrene;
N-phenyl methacrylamide;
3-trifluoromethylstyrene;
vinyl bromide;
vinyl chloride;
1-vinyl-3-ethylurea;
vinyl isocyanate;
p-methoxystyrene;
methyl 1-chloroacrylate;
alpha-methyl styrene;
2-methyl-4-vinyl pyridine;
pentachlorostyrene;
N-p-tolylmethacrylamide;
vinyl acetate;
N-vinyl carbazole;
vinyl ethyl sulfide;
vinyl isothiocyanate;
ethyl methacrylylaminoacetate;
2,5-bis(trifluoromethyl)styrene;
N-(p-chlorophenyl)methacrylamide;
1-dioxy-1-methacrylamido-D-glycital;
1-acrylamido-1-dioxy-D-glycital;
1,1-dihydroperfluorobutyl acrylate;
N-(1,1-dihydroperfluorobutyl)-N-ethyl acrylamide;
2,4-dimethyl-6-vinyl-s-triazine;
N-ethyl-N,1,1-dihydroperfluorobutylacrylamide;
5-ethyl-2-vinylpyridine-N-oxide;
N-(m-fluorosulfonylphenyl)acrylamide; and
N-(m-fluorosulfonylphenyl)methacrylamide.

In still another embodiment of the invention an optional ingredient, in place of or in addition to the olefinically unsaturated monoepoxide polymerizable by free radicals, is a compound containing as its only functional group a single oxirane oxygen atom, sometimes referred to herein as saturated monoepoxy compounds. By a functional group is meant a group such as an oxirane oxygen atom which would participate in the anhydride-monoepoxide cross-linking reaction, i.e., combine chemically with the anhydride, such as for example, —OH, —SH, and —NH groups. One preferred class of liquid organic monooxirane compound can be represented by the general Formula X below:

FORMULA X

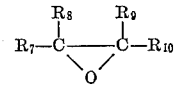

where $R_7$, $R_8$, and $R_9$ are selected from the group consisting of hydrogen, a hydrocarbon radical as defined above, a substituted hydrocarbon radical as defined above; and $R_{10}$ is selected from the group consisting of a hydrocarbon radical as defined above, a substituted hydrocarbon radical as defined above and —OR, where R is any hydrocarbon radical as defined above; and wherein the term "alkyl" for $R_7$, $R_8$, $R_9$, and $R_{10}$ is limited to saturated groups. The total number of carbon atoms in the monoepoxide compound should be such that the compound is liquid at about room temperature. In general, the number of carbon atoms is suitably between 3 and about 20 and preferably between about 3 and 10 per molecule.

The preferred saturated oxirane compounds are the so-called terminal monoepoxides which are represented by the above Formula X when $R_7$ and $R_8$ are hydrogen. When terminal epoxides are used, it is preferred that $R_{10}$ be selected from the group consisting of phenyl, —OR where R is as defined above, saturated aliphatic radicals having between 1 and 18 carbon atoms, and halogen substituted alkyl groups. Examples of suitable oxirane compounds include:

methyl glycidyl ether;
butyl glycidyl ether;
octyl glycidyl ether;
2-propyloctyl glycidyl ether;
phenyl glycidyl ether;
isopropyl glycidyl ether;
1,2-epoxy-3-chlorobutane;
1,2-epoxy propane;
1,2-epoxy butane;
1,2-epoxy hexane;
1,2-epoxy decane;
1,2-epoxy-7-propyldecane;
1,2-epoxy dodecane;
1,2-epoxy-5-chlorododecane;
1,2-epoxy octadecane;
1,2-epoxy eicosane;
1,2-epoxy triacontane;
1,2-epoxy tetracontane;
glycidyl benzoate;
glycidyl acetate;
cyclohexene oxide;
3,4-epoxyhexane;
2,3-epoxy-2-phenylhexane;
1,2-epoxy-2-butoxypropane;
1,2-epoxy-2-phenoxypropane;
glycidyl-p-methylbenzoate;
1,2-epoxy-3-bromopropane (epibromohydrin);
1,2-epoxy-3-chloropropane (epichlorohydrin); and
2,3-epoxy-2,4-dimethyl-4-chlorobutane.

The most preferred optional oxirane compounds are styrene oxide, epichlorohydrin, 1,2-epoxy-2-phenoxypropane, 1,2-epoxy-2-butoxypropane, and epoxidized straight chain alpha monoolefins having between 3 and 20 carbon atoms per molecule such as 1,2-epoxypropane; 1,2-epoxybutane; 1,2-epoxy-octane; 1,2-epoxydodecane; and 1,2-epoxyeicosane.

In determining the A/E ratio described above, all epoxy groups present are taken into account. Thus, when both the saturated epoxides described in the three preceding paragraphs and unsaturated epoxy compounds are present, both are taken into account.

Other ingredients which may be included in the composition of the invention are fillers, solvents, antioxidants, ultraviolet light stabilizers, and other common additives.

The prime criteria for the compositions of this invention is the solubility of the monoanhydride and the vinyl compound or compounds when present in the liquid monoepoxide or monoepoxides to form a solution which is liquid at about room temperature, i.e., at temperatures between about 10° and 30° C. A solution is required in order to obtain a hard, infusible resin which is clear, non-grainy and has excellent solvent resistance properties together with good flexural strength and heat distortion temperatures. The time for solution of the anhydride in the monoepoxide(s) varies depending on the ratio of the materials in the mixture, the temperature, the nature of the materials themselves, and the anhydride to epoxide ratio (A/E ratio). Faster solution of the anhydride will occur at the lower A/E ratios. In addition, it is sometimes desirable to apply heat to effect a faster solution. Since the use of increased temperatures promotes crosslinking and solidification, the temperatures during this premixing are suitably maintained below about 90° C. and preferably below about 60° C. In any event, the solution on cooling to room temperature would still be liquid. As noted above, the compositions of this invention are liquid solutions of the defined vinyl compound and the defined monoanhydride in the defined unsaturated and/or saturated monoepoxide at room temperature, i.e., at temperatures between about 10° and 30° C.

The infusible thermoset resinous reaction product is a network of ester and ether linkages having substantially no carboxylic acid groups therein. The ester linkages are believed to form through the interaction of the anhydride and epoxide groups while the ether linkages are believed to form through the interaction of several epoxide groups. Where the liquid organic monomeric oxirane compound contains only one oxirane oxygen atom as its only functional group, one equivalent of the monooxirane compound is equivalent to one mole.

The time for curing or hardening of the liquid compositions of this invention will vary over a wide range, depending on the reactivity of the particular monoepoxides, monoanhydrides, and vinyl monomer employed. The solution of the anhydrides in the monoepoxide, in general, will not cure at room temperature over reasonable lengths of time of say one to 24 hours. Either higher curing temperatures, as described herein, must be employed or free radical initiators, as defined herein, can be employed to increase the rate of curing.

The temperature at which the copolymerization occurs is not critical and can generally vary from about 25° or below to about 200° C. with a preferred reaction temperature between about 65° and 85° C. The lower limit on reaction temperature is determined by the temperature required to decompose the initiator into free radicals. Thus, the lower reaction temperature will depend to a large extent on the initiator employed. However, most free radical producing initiators, such as the peroxides and others described below, are effective at temperatures as low as 25° C. unless a promoter, such as a ferrous, silver, sulfate or thiosulfate ion, is used in which case much lower temperatures, i.e., −80° C., can be employed. The upper reaction temperature is determined by the boiling point of the components of the reaction mixture and the predominance of unwanted side reactions. One procedure which may be beneficial is to initiate curing at a low temperature, such as room temperature, then to raise the temperature to complete the curing.

The reaction pressure should be sufficient to maintain the materials in the liquid phase. Increased pressure, however, in addition to being an added expense, also promotes unwanted side reactions, such as homopolymerization of the olefinic compound. Pressures can therefore vary between about atmospheric and 100 p.s.i.g., or higher, but the preferred pressure is atmospheric.

The initiator to employ can be any free radical producing material well known in the art. Preferred initiators are the organic peroxides, such as benzoyl, lauryl, and tertiary butyl peroxide. Other suitable free radical producing materials and means include substituted azo compounds, such as alpha,alpha-azobisisobutyronitrile, thermal means, i.e., heat; ultraviolet light; and high energy radiation such as nuclear or X-ray radiation.

It is at times desirable to hasten the decomposition of the peroxide or other source of free radicals. As is known, various compounds, such as amines, activate the catalysts. Suitable in this regard are the tertiary amines such as N,N-dimethylaniline, tri-n-decylamine, pyridine, 3-picoline, phenotriazine, phenazine, and the like.

The amount of the tertiary amine accelerator to employ is between about 0.01 and about 0.1 part of amine catalyst per 100 parts of monoanhydride-vinyl compound-monoepoxide solution. The use of a tertiary amine accelerator and particularly the use of the alkyl substituted anilines and pyridines results in much faster cures.

The invention will be further described with reference to the following specific examples.

EXAMPLES

The solid reactants were dissolved in the liquid ingredients, with agitation at temperatures of from room temperature to 130° C. The solution was then placed in aluminum dishes to provide a body of the solution and cured. In some cases (Examples 2 and 6) the aluminum dish was placed in a container which was sealed before curing. The resulting polymer articles were in the form of clear, hard discs. The reactants, conditions and results were as follows:

| Example | 1 | 2 | 3 | 4 | 5 | 6 |
|---|---|---|---|---|---|---|
| Glycidyl methacrylate, g | 14.9 | 13.1 | 13.4 | 4.6 | 13.1 | 13.1 |
| Maleic anhydride, g | 5.1 | | 4.6 | 13.4 | 4.5 | |
| Phthalic anhydride, g | | 6.9 | | | | 6.9 |
| A/E ratio | 0.5 | 0.5 | 0.5 | 0.5 | 0.5 | 0.5 |
| Hexene-1, g | | | 2.0 | 4.0 | | |
| Styrene | | | | | 2.4 | 10.0 |
| Benzoyl peroxide, g | | | | | .066 | 0.14 |
| N,N-dimethylaniline, g | | | | | .022 | 0.06 |
| Cure | a24 c24 d24 | a24 b24 | a24 c24 d24 | a24 c72 | a24 c24 d24 | b24 |
| Hardness: Barcol 935 | 92 | 93 | 93 | 87 | 82 | 92 | a Hours at room temperature.
b Hours at 150° C.
c Hours at 50° C.
d Hours at 100° C.

The following examples were concerned with coatings, which, in the uncured state, were three mils in thickness unless noted as being of a different thickness.

| Example | 7 | 8 | 9a | 10a |
|---|---|---|---|---|
| Glycidyl acrylate, g | 12.8 | | | |
| Glycidyl methacrylate, g | | 12.8 | 7.1 | 7.1 |
| Maleic anhydride, g | 10 | 10 | | |
| Benzoyl peroxide, g | 0.1 | 0.1 | 0.2 | 0.15 |
| Phthalic anhydride, g | | | 7.4b | 7.4b |
| Styrene, g | | | 5.2 | |
| 3-Picoline, g | 1.15 | 1.15 | 1.0 | 0.7 |
| Cure Temp. ° C | (c) | (c) | (c) | (c) |
| Pencil Hardness | (d) | (d) | | | a Acetone solution.
b Phthalic anhydride precipitated.
c Room Temperature 50–100.
d 2B 6H.

It will be noted that phthalic anhydride, with the A/E ratio and curing temperatures shown in Examples 9 and 10, is unsatisfactory, at least for coatings. As is shown by Examples 2 and 6 phthalic anhydride is suitable for castings where the thickness is substantial, lower A/E ratios are used and curing is conducted in a sealed container.

The following examples were conducted similarly to Examples 7 and 8, but epichlorohydrin was also included.

| Example | 11 | 12 |
|---|---|---|
| Glycidyl acrylate, g | 12.8 | 12.8 |
| Maleic anhydride, g | 10 | 10 |
| Epichlorohydrin, g | 10 | 10 |
| Benzoyl peroxide, g | 0.1 | 0.1 |
| Pigment (Ferro Color Y) | 13.4 | |
| 3-Picoline percent by weight | 5 | 5 |
| Temperature ° C | (a) | (a) |
| Pencil hardness | 5H 7H 7H | HB 3H 3H | a Room Temperature 50-100.

In the above examples relating to coatings, the substrate was glass.

For coatings, it is essential that the unsaturated monomers polymerizable by free radical means (whether an epoxy compound or a vinyl monomer) be such as would give, with maleic anhydride alone, a copolymer having an inherent viscosity of at least 0.5. "Inherent viscosity" is that measured at 77° F. with a solution of 5 grams of polymer per deciliter of acetone. For example, hexene-1 and maleic anhydride do not give a copolymer having an inherent viscosity of 0.5 or greater, and when these two monomers are copolymerized with epichlorohydrin, an unsatisfactory coating is obtained. When a monomer such as glycidyl acrylate or 2-methylpentene-1 are included, which will give a copolymer with maleic having an inherent viscosity of greater than 0.5, even when monomers such as hexane-1 are included in amounts of up to about 40% by weight of the resin, satisfactory coatings are obtained. Useful coating compositions require the presence of maleic anhydride or a substituted maleic anhydride. Furthermore, while some of the compositions are curable at room temperature, others give better coatings at elevated temperatures. These conclusions are based on procedures such as are illustrated in the above and in the following example of a coating composition.

EXAMPLE 13

Maleic anhydride, g.—10
Styrene, g.—10
Epichlorohydrin, g.—2.0
Benzoyl peroxide, g.—0.1
3-picoline—5%
Temp., ° C. (24 hours)—RT 50 100
Pencil hardness—1H 5H The substrate for the above coating was glass, and the coating was three mils in thickness.

Although the invention has been described in considerable detail with reference to certain preferred embodiments thereof, it will be understood that variations and modifications can be effected without departing from the spirit and scope of the invention as described hereinabove and as defined in the appended claims.

We claim:
1. A solution, curable to a solid resin, comprising:
   a monoepoxide having as its only functional group a single oxirane oxygen atom;
   maleic anhydride or a derivative thereof having radicals other than hydrogen on one or both of the α-carbon atoms;
   a vinyl monomer which is polymerizable by a free radical mechanism;
   and a free radical initiator;
   each of said monomers being free of —COOH groups, the anhydride groups to epoxy groups ratio on an equivalency basis being from about 0.2:1 to 2:1.
2. A solution, curable to a solid resin, comprising:
   an olefinically unsaturated monoepoxide polymerizable by free radicals;
   maleic anhydride or a derivative thereof having radicals other than hydrogen on one or both of the α-carbon atoms;
   optionally, a vinyl monomer;
   and a free radical initiator;
   each of said monomers being free of —COOH groups, the anhydride groups to epoxy groups ratio on an equivalency basis being from about 0.2:1 to 2:1.
3. A solution, curable to a solid resin, comprising:
   an olefinically unsaturated monoepoxide polymerizable by free radical means;
   a monoanhydride having from 4 to 5 carbon atoms in the anhydride ring, said anhydride ring being free of olefinic unsaturation;
   optionally, a vinyl monomer which is polymerizable by a free radical mechanism;
   and a free radical initiator;
   each of said monomers being free of —COOH groups, the anhydride groups to epoxy groups ratio on an equivalency basis being from about 0.2:1 to 2:1.
4. A solution, curable to a solid resin, comprising:
   maleic anhydride or a substituted maleic anhydride;
   at least one vinyl hydrocarbon monomer which is capable of copolymerizing with maleic anhydride or a substituted maleic anhydride by free radical means to produce a copolymer having a dilute solution viscosity of at least 0.5;
   at least one liquid monomer containing a single epoxy group;
   and a free radical initiator;
   each of said monomers being free of —COOH groups, the anhydride groups to epoxy groups ratio on an equivalency basis being from about 0.2:1 to 2:1.
5. The composition of claim 2 containing in addition a vinyl monomer.
6. An article of manufacture comprising the cured reaction product of the composition of claim 1.
7. An article of manufacture comprising the cured reaction product of the composition of claim 2.
8. An article of manufacture comprising the cured reaction product of the composition of claim 3.
9. An article of manufacture comprising the cured reaction product of the composition of claim 4.
10. A method of forming an article of manufacture comprising the steps of establishing a body of the liquid composition of claim 1 and curing the same.
11. A method of forming an article of manufacture comprising the steps of establishing a body of the liquid composition of claim 2 and curing the same.
12. A method of forming an article of manufacture comprising the steps of forming a body of the liquid composition of claim 3 and curing the same.
13. A method of forming an article of manufacture comprising the steps of forming a body of the liquid composition of claim 4 and curing the same.

References Cited

UNITED STATES PATENTS

| | | | |
|---|---|---|---|
| 3,374,209 | 3/1968 | Hay et al. | 260—78.4 |
| 2,822,350 | 2/1958 | Hayes | 260—78.4 |
| 2,966,479 | 12/1960 | Fischer | 260—78.4 |
| 3,441,543 | 4/1969 | Heilman | 260—78.5 |
| 3,453,246 | 7/1969 | Heilman | 260—78.5 |

JOSEPH L. SCHOFER, Primary Examiner

J. KIGHT III, Assistant Examiner

U.S. Cl. X.R.

117—161

UNITED STATES PATENT OFFICE
CERTIFICATE OF CORRECTION

Patent No. 3,531,547    Dated September 29, 1970

Inventor(s) Stanley M. Hazen and William J. Heilman

It is certified that error appears in the above-identified patent and that said Letters Patent are hereby corrected as shown below:

Column 1, line 16, "monohydride" should read -- monoanhydride --.
Column 3, line 8, "at" should read -- as --.
Column 7, line 9, "aralyl" should read -- aralkyl --.
Column 7, line 60, "(2.2.1.)" should read -- (2.2.1) --.
Column 8, lines 16 and 17, "compound" should read -- compounds --.
Column 9, line 49, " -CORR" " should read -- -COOR" --.
Column 10, line 9:

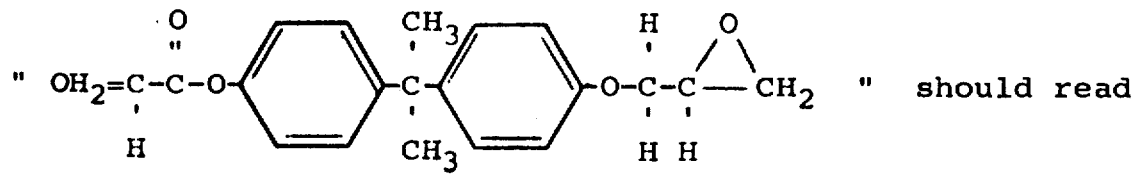

should read

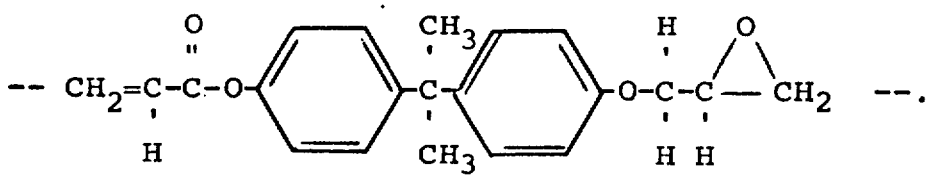

Column 11, line 6, "-OM" should read -- -OH --.
Column 11, line 39, after "radical;" -- -C≡N; an aromatic organic radical; -- has been omitted.
Column 11, line 51, "-$CR_{30}R_{31}R_{31}$" should read -- -$CR_{30}R_{31}R_{32}$ --.

Column 16, lines 68 and 69 of the Table, for clarification:

| Example | 7 | 8 | 9[a] | 10[a] |
|---|---|---|---|---|
| Cure Temp., °C. | (c) | (c) | (c) | (c) |
| Pencil Hardness | (d) | (d) | ------- | ------- |

(c) Room Temperature 50-100
(d) 2B 6H should read (Continued on Page 2)

UNITED STATES PATENT OFFICE
CERTIFICATE OF CORRECTION

Patent No. 3,531,547      Dated September 29, 1970

Inventor(s) Stanely M. Hazen and William J. Heilman

It is certified that error appears in the above-identified patent and that said Letters Patent are hereby corrected as shown below:

Page 2

| Example | 7 | | | 8 | | | 9[a] | | | 10[a] | | |
|---|---|---|---|---|---|---|---|---|---|---|---|---|
| Cure Temp., °C. | RT | 50 | 100 | RT | 50 | 100 | RT | 50 | 100 | RT | 50 | 100 |
| Pencil Hardness | - | 2B | 6H | - | 2B | 6H | - | - | - | - | - | - |

Column 17, lines 49 and 50, for clarification purposes:

"Temp., °C. (24 Hours) — RT 50 100
Pencil Hardness — 1H 5H "

should read

-- Temp., °C. (24 Hours) — RT 50 100 --
    Pencil Hardness —    -- 1H 5H

Signed and sealed this 22nd day of June 1971.

(SEAL)
Attest:

EDWARD M. FLETCHER, JR.       WILLIAM E. SCHUYLER, JR.
Attesting Officer      Commissioner of Patents